United States Patent [19]
Cary

[11] 3,859,764
[45] Jan. 14, 1975

[54] PLATE AND NON-REMOVABLE SCREW ASSEMBLY

[76] Inventor: Neal A. Cary, 3570 Fancher Rd., Fancher, N.Y. 14452

[22] Filed: May 7, 1973

[21] Appl. No.: 357,805

[52] U.S. Cl. .............................................. 52/217
[51] Int. Cl. ........................... E06b 1/08, E06b 1/06
[58] Field of Search ......... 52/217, 213, 215; 151/69

[56] References Cited
UNITED STATES PATENTS

| | | | |
|---|---|---|---|
| 2,492,115 | 12/1949 | Crowther | 151/69 |
| 2,568,584 | 9/1951 | Hartman | 451/69 |
| 2,727,220 | 12/1955 | Bachanan | 151/69 |
| 2,835,933 | 5/1958 | Evans | 52/217 |
| 2,929,474 | 3/1960 | Boardman | 151/69 |
| 3,224,152 | 12/1965 | Evans | 52/217 |
| 3,239,978 | 3/1966 | Parker | 52/217 |
| 3,394,747 | 7/1968 | Daffy | 151/69 |
| 3,584,418 | 6/1971 | Penkala | 52/217 |

Primary Examiner—Ernest R. Purser
Assistant Examiner—Henry Raduazo

[57] ABSTRACT

A plate and non-removable screw assembly in which the plate is provided with an opening therethrough, and a screw retaining member secured thereto having one or more flexible lips in which the ends thereof in their normal unflexed condition define an opening in alignment with the plate opening. A screw having a spiral thread and groove is threaded through the plate and lip openings, and is provided with a peripheral channel defining a cylindrical neck having a diameter less than the distance between the lip ends in their normal unflexed condition. Such distance is further less than the diameter of the screw surface defining the groove adjacent the channel. Accordingly, when the screw is threaded through the plate and lip openings, the screw surface causes the lip ends to flex apart, and when the lip ends reach the channel, they snap therein and return to their original normal position. In such position, the lips are captive in the channel and prevent removal of the screw from the screw retaining member, while allowing the screw to be turned in either direction for laterally adjusting the plate relative to a fixed screw receiving member.

1 Claim, 7 Drawing Figures

PATENTED JAN 14 1975  3,859,764
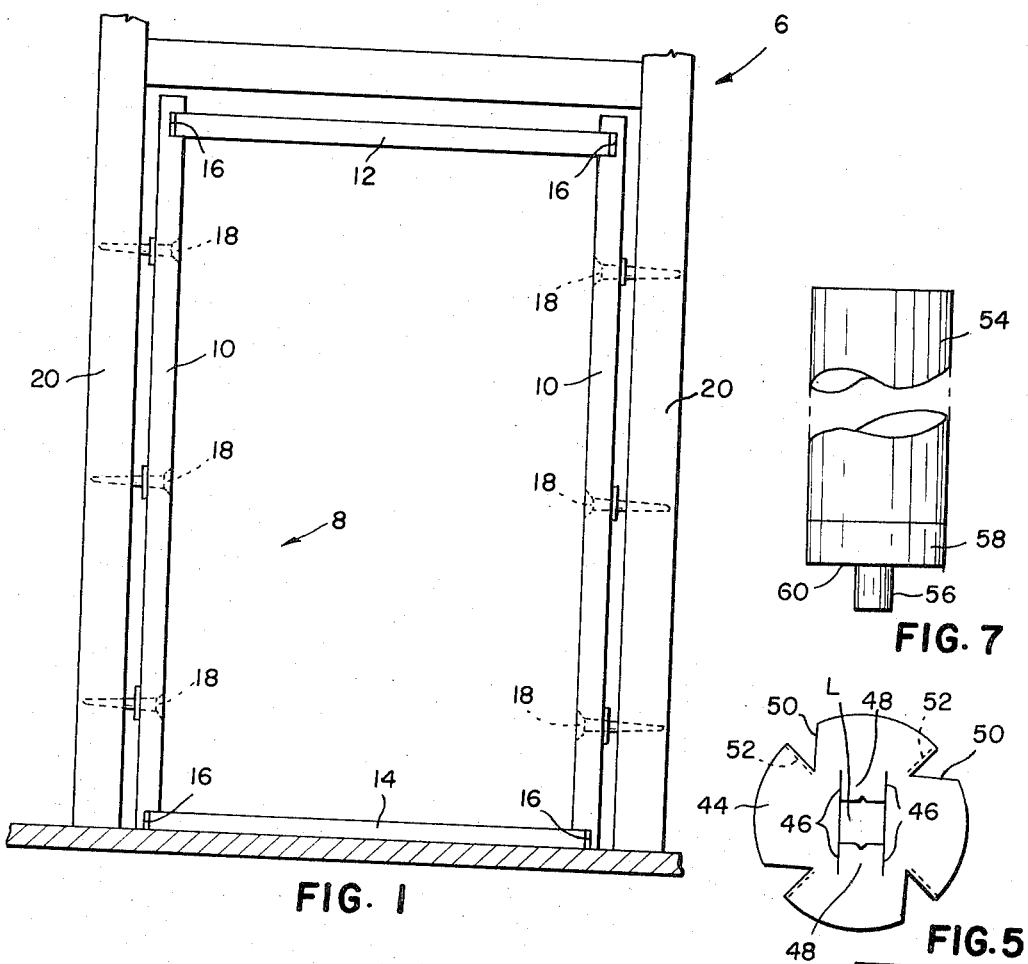
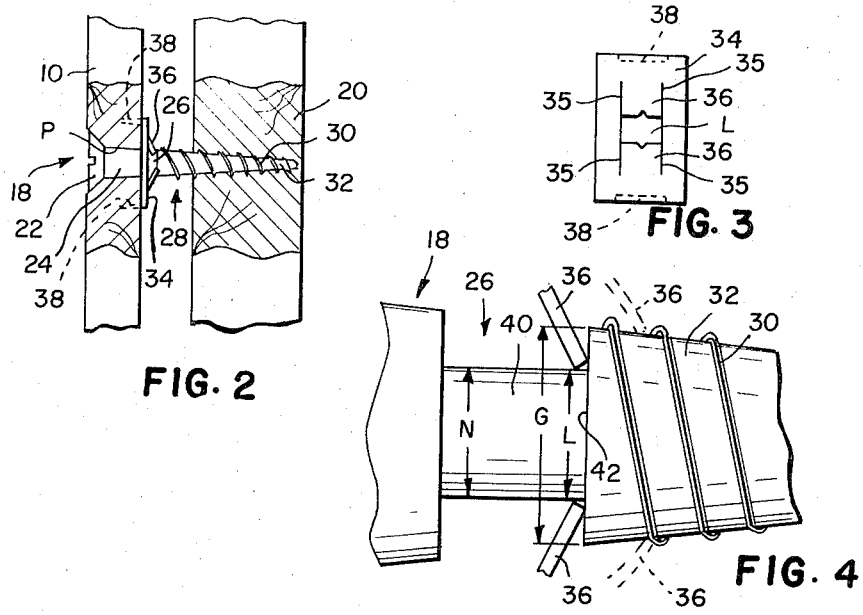

PLATE AND NON-REMOVABLE SCREW ASSEMBLY

BACKGROUND OF THE INVENTION

1. Field of the Invention

This invention relates generally to screw fasteners, and more specifically to a plate and non-removable screw assembly.

2. Description of the Prior Art

Plate and non-removable screw assemblies are generally well known in the art, and find particular application in the adjustable door frame art as exemplified by U.S. Pat. No. 3,224,152. In this patent, a door jamb is disclosed having a beveled opening for receiving a split sleeve provided at one end with a beveled flange. A screw having a head, a shank, a threaded end, and a peripheral channel between the shank and adjacent thread of the threaded end is inserted through the sleeve and threaded until the beveled flange snaps into the channel preventing removal of the screw from the door jamb. Although the jamb and screw assembly operates satisfactorily for door frames in which the jamb is fabricated of sheet metal of small thickness such as one thirty-seconds of an inch, it is unsuitable for rigid plate members of greater thickness. In addition, the split sleeve inserts are costly to manufacture and to install. Such sleeve inserts are further not readily adaptable to flat plates because the sleeve extends laterally outwardly a greater distance than is permissible for many applications.

SUMMARY OF THE INVENTION

In accordance with a preferred embodiment of the invention, a plate and non-removable screw assembly for a door frame is disclosed in which the plate is provided with an opening, and with a flat screw retaining member secured thereto having one or more flexible lips provided at the ends thereof with an opening in alignment with the plate opening. A screw having a spiral groove and a peripheral channel defining a cylindrical neck spaced from the head a distance substantially equal to the thickness of the plate, is threaded through the opening in the plate and the aligned opening defined by the lip ends. The diameter of the screw surface defining the groove adjacent the channel is greater than the distance between the lip ends in their normal unflexed condition, and such distance is substantially equal to the diameter of the neck. When the screw is initially threaded through the plate and lip(s), the flexible lip or lip ends are initially spread or flexed apart to accommodate the groove, and then when moved into register with the channel, snap into engagement with the neck. In such position, the lip(s) are captive in the channel, and it is no longer possible to remove the screw from the plate. However, the screw can be rotated in either direction to adjust the plate and screw relative to a fixed screw receiving member such as a wooden stud.

It is, accordingly, one of the objects and advantages of the present invention to provide an improved plate and non-removable screw assembly that is of simple design and construction, thoroughly reliable and efficient in operation, and economical to manufacture.

Another object and advantage of the invention is to provide an improved door jamb and non-removable screw assembly to facilitate adjustment of the door jamb relative to a fixed stud.

Another object and advantage of the invention is to provide an improved plate and non-removable screw assembly that can be assembled with facility and at a minimum cost.

Another object and advantage of the invention is to provide an assembly tool to facilitate assembly of the plate and screw retaining member.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 1 is a segmental front elevational view illustrating a preferred embodiment of the invention incorporated in an adjustable door jamb assembly.

FIG. 2 is an enlarged segmental view in section of one of the screw assemblies of FIG. 1;

FIG. 3 is an enlarged front elevational view of the retaining nut of FIG. 2;

FIG. 4 is a segmental enlarged side elevational view of the screw of FIG. 2;

FIG. 5 is a front elevational view of another embodiment of the screw retaining member of this invention;

FIG. 6 is a side elevational view of the screw retaining member of FIG. 5; and

FIG. 7 is a side elevational view of an assembly tool for this invention.

DESCRIPTION OF THE PREFERRED EMBODIMENT

Because plate and non-removable screw assemblies are well known, the present description will be directed in particular to elements forming part of, or cooperating more directly with, apparatus in accordance with the present invention. Door and screw elements not specifically shown or described herein should be understood to be selectable from those known in the art.

With reference to FIG. 1 of the drawings, a preferred embodiment of the invention is illustrated in connection with an adjustable door jamb assembly 6. The door jamb assembly 6 comprises a rectangular frame 8 which may be quickly and easily plumbed and adjusted laterally to accurately locate a door, not shown, relative to the door frame. The frame 8 is formed by spaced plates such as side jambs 10 connected at the upper and lower ends by a head jamb 12 and a sill 14 respectively, as is well known in the art. The ends of side jambs 8 are preferably dadoed or transversely channeled at 16 to receive the ends of head jamb 12 and sill 14 to permit relative lateral movement of the jamb to accommodate and provide the door with the desired clearance at the sides. If desired, the dadoes or channels 16 can be enlarged in a vertical direction to permit relative vertical movement of head jamb 12 to provide the door with the desired clearance at the top. Such adjustment of the jambs 10, 12 is achieved by a plurality of adjusting, non-removable screws 18 of this invention extending through jamb 10 at spaced intervals, and adjustably screwed into a fixed wood stud 20. Although the plate and non-removable screw assembly 6 is particularly applicable to an adjustable door jamb assembly, it should be understood that the plate and non-removable screw assembly is not specifically limited to a door jamb assembly, but may have utility in other applications.

The plate and non-removable screw assembly 6 of the invention, as best illustrated in FIGS. 2–4, comprises the aforementioned adjusting screw 18 having a head 22, a shank 24, a channel 26, and a threaded portion 28 adjacent the channel having a spiral thread 30 and a screw surface therebetween defining a spiral groove 32 having a predetermined groove diameter adjacent the channel designated G (FIG. 4). The plate 10, such as a door jamb, for receiving screw 18 has front and rear surfaces spaced apart a predetermined distance and provided with one or more plate openings designated P extending from one surface to the other for receiving shank 24 and beveled head 22 of screw 18 when the screw is inserted or threaded therethrough. The opening P is provided adjacent the front surface with a beveled portion to receive the beveled head 22 of the screw so that the end surface thereof is flush with the front surface of the plate when the screw is moved through the opening to its innermost position, as illustrated in FIG. 2.

One embodiment of a screw retaining nut 34 for plate 10 is illustrated in FIGS. 2–4, and is preferably formed by any suitable sheet metal stamping operation. Such nut 34 has a flat or slightly arcuate body portion provided with shear lines 35 therethrough forming a pair of opposed, facing flexible lips 36, flared outwardly at a slight angle to the stamping, but substantially in the plane thereof. Although two lips 36 are illustrated, it should be understood that the invention encompasses any number of such lips. The nut 34 has a central portion sheared off to define the ends of lips 36 which in their normal unflexed condition, define a screw receiving opening designated L (FIG. 4). The nut 34 is further provided with one or more laterally extending barbs 38, two of which are illustrated in FIG. 3, for securing nut 34 to plate 10 by pressing or nailing the barbs into the plate with the nut opening L in axial alignment with the plate opening P. Although nut 34 is secured to plate 10 by barbs 38, it can be secured to the plate by any other suitable means. The nut opening L is spaced from the front surface of plate 10 a predetermined distance, and the peripheral channel 26 defines a cylindrical neck 40 (FIG. 4) spaced from the head surface substantially the same distance. The neck of the screw has a diameter N that is less than groove diameter G, and substantially equal to the normal nut opening diameter L. Accordingly, when screw 18 is threaded through nut 34, the flexible lips 36 are flexed or bowed outwardly, as seen dotted in FIG. 4, to accommodate the screw surface defining spiral groove 32, and when the end of the groove is reached, the lips 36 snap into channel 26 to releasably secure the screw to the plate, as best illustrated in FIG. 4. The lips 36 are captive in channel 26 and the ends thereof, preferably bear against a side surface 42 of channel 26 to hold screw 18 in its fully inserted position. In this position, screw 18 can then be turned in either direction causing the threaded portion 28 to be screwed into or out of a fixed member, such as stud 20, for adjusting plate 10 relative to the stud without removing screw 18 from plate 10.

Another embodiment of the screw retaining member of this invention is illustrated in FIGS. 5 and 6. In this embodiment a disk-like retaining member 44 formed by a stamping operation or the like is provided having shear lines 46 therethrough, and a central portion sheared off to define a pair of lips 48, which in their unflexed condition define a screw receiving opening L. The retaining member 44 further has shear lines 50 therethrough adjacent the periphery, and the sheared material is bent transverse to the member to form one or more barbs 52.

To facilitate assembly of a screw retaining member 34 or 44 to a stud 20, an assembly tool 54 is illustrated in FIG. 7 having a locating finger 56 of any suitable shape insertable through the opening L of the retaining member. The tool 54 has a portion 58 thereof adjacent finger 56 provided with or formed as a permanent magnet. Accordingly, the retaining member 34, 44 is releasably held in engagement with magnetic shoulder 60 of tool 54. The tool with a retaining member secured thereto is positioned with finger 56 extending into opening P of plate 10 for aligning openings P and L. The tool 54 is then tapped or pressed against plate 10 causing barbs 38, 52 to enter the plate for securing the member 34, 44 to the plate in proper orientation.

The invention has been described in detail with particular reference to a preferred embodiment thereof, but it will be understood that variations and modifications can be effected within the spirit and scope of the invention as described hereinabove.

What is claimed is:

1. In a wooden door frame having an improved plate and non-removable screw assembly for adjustably positioning the door frame relative to fixed wooden studs, the combination comprising:

a wooden plate of said door frame having front and rear planar surfaces in which said door frame is positioned with said rear surface facing a fixed wooden stud;

said plate further defining a first opening extending through said plate from said front surface to said rear surface; and a substantially flat screw-retaining member having a plurality of transversely extending barbs insertable into said wooden plate for securing said member to said rear plate surface in substantially parallel relation thereto, said screw retaining member having a plurality of flexible lips extending substantially parallel to said plate, said lips having ends thereof lying in the same plane as said lips and facing and spaced from one another to define a second opening in register with said first opening for threadingly receiving a screw having a head engageable with said front plate surface and a shank extendable through said first opening and provided with a spiral thread and groove screwable through said second opening into the fixed wooden stud, said second opening having a diameter less than the maximum root diameter of the spiral groove of the screw threaded therethrough whereby said lips are flexed by the groove, and said screw further having a peripheral channel axially spaced from a surface of said head a distance substantially equal to the perpendicular distance between said front plate surface and said lips, said channel further defining a cylindrical neck having a diameter smaller than the spiral groove root diameter adjacent said neck whereby said flexed lips enter said channel and said screw cannot be removed from said plate when said screw is screwed into said plate with said head of said screw substantially in engagement with said front plate surface and said lips in register with said channel.

* * * * *